(No Model.)

H. J. H. TOFT.
DEVICE FOR STOPPING UNRULY HORSES.

No. 514,100. Patented Feb. 6, 1894.

United States Patent Office.

HANS JÖRGEN HANSÈN TOFT, OF COPENHAGEN, DENMARK.

DEVICE FOR STOPPING UNRULY HORSES.

SPECIFICATION forming part of Letters Patent No. 514,100, dated February 6, 1894.

Application filed April 28, 1893. Serial No. 472,280. (No model.)

*To all whom it may concern:*

Be it known that I, HANS JÖRGEN HANSÈN TOFT, residing at Copenhagen, in the Kingdom of Denmark, have invented certain new and useful Improvements in Apparatus for Stopping Unruly Horses, of which the following is a specification.

The device is adapted to be hooked firmly to the bit, close to the mouth piece; the lower part hanging down below the mouth of the horse. When the coachman pulls a line, which is in connection with the apparatus two cushions will be pressed around the nostrils of the horse thus stopping the passage of air to the horse's lungs and the effect will be to stop the horse immediately.

Figure 1:
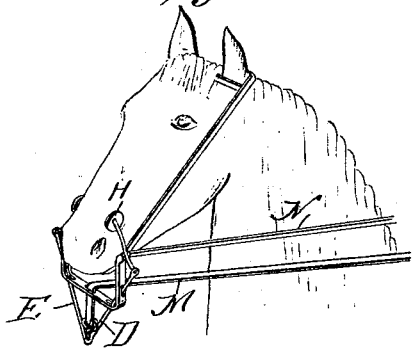
Figure 2:
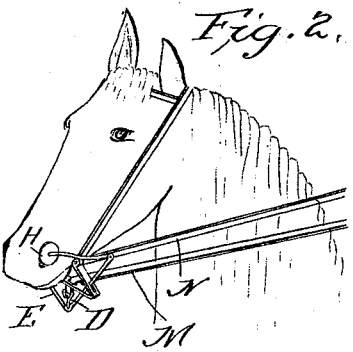
Figure 3:
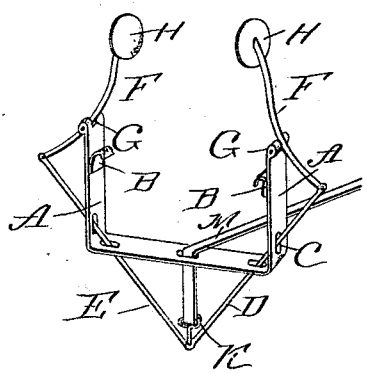

Figure 1, shows the device in place. Fig. 2, shows it when operated, with the two cushions around the nostrils. Fig. 3, shows the apparatus detached.

A, signifies a rectangular bent bow, which at the points B is fixed to the bit. Through the openings C in the corners two bars D, E, are conducted which are connected at their lower ends, their upper ends being in connection with the arms F, which are pivoted at G in the upper ends of the bow A. At the ends of these arms the cushions H are placed. To the lower joined ends of the bars D, E is connected a ring K to which is connected a strap or line M, which in an appropriate manner is led up to the box seat. By a pull at this line the apparatus changes its position which is shown in Fig. 1, to the position in Fig. 2. The position which is shown in Fig. 3 corresponds to Fig. 1.

I claim—

In combination, the bow A having a lower cross piece and upwardly extending sides, the arms F pivoted at the upper ends of said sides, the said bow having guiding openings, the rods passing through said openings, and connected together at their lower ends, and the strap M passing through a central opening in the lower bar and connected to the rods, substantially as described.

In witness whereof I have hereunto set my hand in presence of two witnesses.

HANS JÖRGEN HANSÈN TOFT.

Witnesses:
ANTHON STERNBERG,
HANS PEDERSEN.